3,274,189
NOVEL COMPOSITIONS FOR TREATING TEXTILES AND PROCESS FOR MAKING SAME UTILIZING PHOSPHORIC ACID
Louis W. Smith, Danville, Va., assignor to Dan River Mills, Incorporated, Danville, Va., a corporation of Virginia
No Drawing. Filed Apr. 22, 1963, Ser. No. 274,851
3 Claims. (Cl. 260—248)

This invention relates to new methods of making textile creaseproofing compositions and to new methods of treating textiles therewith. In addition, this invention is directed to novel creaseproofing compositions and cellulosic textile fabrics treated therewith.

It is well-known that textiles can be provided with crease-resistance by treatments with a large variety of nitrogen-containing compounds, such as urea-formaldehyde condensates, triazone-formaldehyde condensates, e.g., 1,3-dimethylol-3,4,5,6-tetrahydro-5(2-hydroxyethyl)-s-triazine-2-one and 1,3-dimethylol-3,4,5,6-tetrahydro-5-ethyl-s-triazin-2-one, hereinafter referred to as hydroxyethyl triazone and ethyl triazone respectively, melamine-formaldehyde condensates, and mixtures thereof. Many of the creaseproofing agents made from nitrogen-containing compounds are defective in that they retain chlorine brought into contact with them by bleaching operations. Such retained chlorine, in many instances, is released in the form of acidic materials during subsequent pressing to deteriorate and/or objectionably discolor the fabric. Mixtures of urea-formaldehyde condensates, especially dimethylol urea, and triazone-formaldehyde condensates, e.g., hydroxyethyl triazone or ethyl triazone, had been found to impart low damage by retained chlorine to fabrics treated therewith and for this reason have been widely used in creaseproofing fabrics. In the use of these mixtures, however, rigorous curing conditions, e.g., strongly acidic catalysts, such as zinc nitrate, and high curing temperatures, have been heretofore necessary to achieve an acceptable degree of crease-resistance in fabrics treated therewith.

It is, therefore, a principal object of this invention to provide a novel method for producing a novel creaseproofing composition which, when applied to fabrics, is curable under relatively mild conditions.

It is a further object of this invention to provide novel methods for producing novel creaseproofing compositions which can be cured on fabrics under relatively mild conditions to provide high crease-resistance and low damage from retained chlorine.

Another object is the provision of a novel method of creaseproofing textile fabrics requiring relatively mild curing conditions to produce novel crease-resistant fabrics exhibiting low damage from retained chlorine.

Further objects and advantages will be apparent from the following description.

According to this invention, the novel method for making readily curable textile creaseproofing compositions comprises heating urea, formaldehyde and monoethanolamine in an aqueous mixture and in sufficient amounts to form an aqueous mixture containing hydroxyethyl triazone and dimethylol urea, followed by adding an amount of phosphoric acid in the range of 0.04 to 0.2 mol of phosphoric acid per mol of monoethanolamine, and thereafter, if necessary, adding a sufficient amount of an alkali metal hydroxide to adjust the pH of said mixture to a value in the range of 5 to 7. It is preferred that the amount of phosphoric acid added to the aqueous mixture of hydroxyethyl triazone and dimethylol urea be sufficient to adjust the pH of said mixture at or below 5.

The resulting composition has been found unexpectedly to be curable under considerably milder conditions than similar mixtures containing hydroxyethyl triazone and dimethylol urea prepared in a similar manner without however, the addition of phosphoric acid in the manner described above. In addition, it has been unexpectedly found that fabrics treated by the novel compositions of this invention exhibit a considerably lower amount of damage from retained chlorine, undergo little or no discoloration when subjected to high temperatures, i.e., they have high resistance to scorching, whether or not they have been previously bleached, and have little or no odor, a problem which previously plagued nitrogen-containing creaseproofing materials. It has furthermore been found unexpectedly that surprising results from the treatment with phosphoric acid in the manner of the method of this invention are specific to triazones and have not been found to occur when other nitrogen-containing resins or mixtures thereof are treated with phosphoric acid in the same manner. Other acids employed in place of phosphoric acid in the above treatment and lesser amounts of phosphoric acid also fail to provide the above-mentioned surprising results of milder curing conditions, increased crease-resistane and lower percentages of damage from retained chlorine when used with mixtures of hydroxyethyl triazone and dimethylol urea, or other nitrogen-containing creaseproofing compounds or mixtures thereof.

The mixture containing hydroxyethyl triazone and dimethylol ureas can be obtained in various ways, e.g., by mixing formaldehyde, urea, ethanolamine and water and heating until said mixture is formed. The mixture is thereafter cooled and the phosphoric acid is added in accordance with this invention. Thereafter, if necessary, the pH is adjusted to a value in the range of 5 to 7 by the addition of an alkali metal hydroxide. In an advantageous procedure, Formalin and urea are stirred until all of the urea is dissolved and then ethanolamine is slowly added with stirring. An exothermic reaction takes place with the addition of the ethanolamine and the formation of the mixture containing hydroxyethyl triazone and dimethylol urea is furthered by heating for a short period of time.

The aqueous mixture containing hydroxyethyl triazone and dimethylol urea to be treated by phosphoric acid in accordance with this invention preferably contains from 50 to 100 mol percent of hydroxyethyl triazone, 0 to 50 mol percent of dimethylol urea and, as desired, may contain 0 to 25 weight percent excess of formaldehyde over the theoretical amount required for formation of the dimethylol urea and hydroxyethyl triazone.

The application of the novel compositions of this invention to the fabric to be creaseproofed can be carried out in any convenient manner. The amount of said novel compositions applied to the fabric is not narrowly critical and can vary, for example, from 2 to 15 weight percent of solids in said novel compositions based on the dry weight of fabric. It is advantageous to employ a mild catalyst, preferably magnesium chloride, in the aqueous solution of said novel compositions. The particular concentration of solids in said aqueous solutions of the novel compositions is not narrowly critical and, to a large extent, will depend upon the most convenient wet pick-up of the composition on the fabric with regard to the equipment being used and the desired production schedules. In general, a 50 to 100 percent wet pick-up based on the dry weight of fabric is advantageous and a wet pick-up in the neighborhood of 70 percent is preferred. The amount of mild catalyst is not narrowly critical and, for example, in the case of magnesium chloride hexahydrate, can vary from about 10 weight percent to about 30 weight percent based on the total weight of solids of said novel compositions.

The aqueous solutions of novel compositions used to treat fabrics can also contain other materials for providing special or desired effects, such materials including suitable wetting agents, lubricants, whiteners, softeners and the like.

After impregnating the fabric with the aqueous solution of the novel compositions, the impregnated fabric is either dried and cured in one operation or is first dried and then cured. It is preferable to dry the impregnated fabric under such conditions that the moisture content thereof is suitably reduced prior to curing. For best results, the drying conditions should not be so severe that the curing of the impregnated fabric is begun. It is preferable to dry the fabric at ambient temperatures in the air or at somewhat elevated temperatures up to about 300° F. In general, drying should be sufficient to provide a relatively low moisture content, for example, about 3 weight percent based on the dry weight of fabric, prior to commencement of the curing. Curing of the dried impregnated fabric is best conducted at temperatures of 280 to 350° F. for 30 seconds to 5 minutes.

After curing, the fabric can then be subjected to the usual after-treatments, such as bleaching, bluing, top softening, compressive shrinking and the like.

The following examples are presented. In these examples all parts and percentages are based on weight. The crease-resistant values were determined by the Monsanto Crease Recovery Test (A.A.T.C.C. Tentative Test Method 66—1959T), the filling tear values were determined by the Trapezoid method, the filling tensile values were determined by the Grab method, and the percent damage from retained chlorine values were determined by A.A.T.C.C. Standard Test Method 92—1962.

EXAMPLE 1

A mixture of 60 parts urea and 331 parts of Formalin (37 percent aqueous formaldehyde) was prepared and stirred until all of the urea was dissolved. 42.7 parts of monoethanolamine were then added to the resulting mixture with stirring. An exothermic reaction ensued. After all of the monothanolamine had been added, the resulting mixture was heated to 190–195° F. for 10 minutes. Thereafter, the resulting mixture was cooled to 100° F. and 9 parts of 75 percent phosphoric acid were slowly added. The resulting pH of said mixture was 4.1. Thereafter, a sufficient amount of a 50 percent aqueous sodium hydroxide solution was added to adjust the pH to 6.4.

EXAMPLE 2

The preparation described in Example 1 was repeated, except that hydrochloric acid was employed in place of phosphoric acid.

EXAMPLE 3

Samples of bleached, mercerized, cotton fabric weighing 3.1 ounces per square yard and having a construction of 80 x 78 were separately treated with the compositions of Examples 1 and 2 to which magnesium chloride, $$MgCl_2 \cdot 6H_2O$$

had been added, to provide 5.1 percent of said compositions and 1.75 percent of the magnesium chloride based on the weight of the fabric. After drying, the treated fabrics were then cured for 70 seconds at the temperatures indicated in Table I below. The crease recovery values, filling tear values, filling tensile values and percent damage from retained chlorine are also listed in Table I below.

*Table I*

| Composition of Example | Cure Temperature, °F. | Crease Recovery Warp and Filling | Filling Tear Trapezoid, lbs. | Filling Tensile Grab, lbs. | Percent Damage From Retained Chlorine |
|---|---|---|---|---|---|
| 2 | 300 | 199 | 3.3 | 52.6 | 21 |
| 2 | 340 | 222 | 3.0 | 52.8 | 7 |
| 1 | 300 | 219 | 2.9 | 45.9 | 8 |
| 1 | 340 | 240 | 2.7 | 48.6 | 0 |

EXAMPLE 4

Samples of bleached, mercerized, cotton fabric weighing 3.1 ounces per square yard and having a construction of 80 x 78 were respectively treated with the compositions prepared in Examples 1 and 2, to which magnesium chloride, $MgCl_2 \cdot 6H_2O$ had been added, to provide 10.2 percent of said compositions and 2.45 percent of magnesium chloride based on the weight of fabric. After drying, each sample was cured for 70 seconds at the temperatures indicated in Table II below. After curing, the samples exhibited the crease recovery values, filling tear values, filling tensile values and the percent damage from retained chlorine set forth in Table II below.

*Table II*

| Composition of Example | Cure Temperature, °F. | Crease Recovery Warp and Filling | Filling Tear Trapezoid, lbs. | Filling Tensile Grab, lbs. | Percent Damage From Retained Chlorine |
|---|---|---|---|---|---|
| 2 | 300 | 213 | 3.2 | 53.2 | 31 |
| 2 | 340 | 247 | 2.8 | 46.3 | 24 |
| 1 | 300 | 249 | 2.6 | 45.0 | 9 |
| 1 | 340 | 269 | 2.2 | 42.4 | 7 |

EXAMPLE 5

A mixture containing about 35.3% formaldehyde, 14.7% urea, 8.95% monoethanolamine and about 41.1% water was prepared and heated under a reflux condenser at the reflux temperature (about 100° C.) for 2½ hours, and it was then cooled and neutralized to pH 7 with phosphoric acid, all in accordance with Example 12 of U.S. Patent No. 3,051,674 issued to Bernard H. Kress on August 28, 1962. The amount of phosphoric acid required for neutralization was about 1 drop (0.06 gram) of $H_3PO_4$ per 351 grams of the mixture, amounting to less than about 0.02% of said mixture.

*Composition A.*—Composition A was prepared by mixing 165 parts of the above mixture with 3.3 parts of 85% phosphoric acid which dropped the pH down to about 3.58 and then adding 2.9 parts of 50% sodium hydroxide to raise the pH to about 6.2.

*Composition B.*—Composition B was prepared by adding 6.2 parts of water to 165 grams of the above mixture. By so doing the percentage of active materials in compositions A and B was identical.

EXAMPLE 6

Samples of cotton fabric identical to those employed in previous examples were separately treated with compositions A and B by padding the sample through an aqueous pad bath containing 10% of the composition (A or B), 2% magnesium chloride as a catalyst and 0.75% dicyandiamide which reduces discoloration of the treated fabric by heat, to provide a 60% wet pickup on the sample. After drying, each sample was cured at 300° F. for 70 seconds. After curing the samples had the properties set forth in Tables III and IV below:

*Table III*

| Composition | Crease Recovery Warp and Filling | Filling Tear Trapezoid, lbs. | Filling Tensile Grab, lbs. | Percent Damage From Retained Chlorine | Odor [1] |
|---|---|---|---|---|---|
| A | 238 | 3.2 | 45 | 13 | 2,100 |
| B | 194 | 3.9 | 49 | 28 | 3,100 |

[1] Parts of formaldehyde evolved per million parts of fabric when one gram of fabric is suspended at 120° F. for 20 hours in a one quart capacity closed container over 50 ml. of water and the evolved formaldehyde determined by a colorimetric determination of the amount of formaldehyde absorbed in the water.

*Table IV*

REFLECTANCE [1]

| Composition | Original | After Suter Scorch [2] |
|---|---|---|
| A | 87.9 | 77.9 |
| B | 88.4 | 71.6 |

[1] Measured by Hunter Reflectometer with blue filter (freshly scraped magnesium oxide block = 100).
[2] Samples scorched for 30 seconds at 400° F. on Atlas Scorch Tester.

The properties shown in Tables III and IV clearly illustrate that composition A is considerably superior to composition B in providing (1- much higher crease resistance, (2- much less damage from retained chlorine, (3- much less odor, and (4) greater resistance to scorching both before and after bleaching.

The amount of phosphoric acid used in the compositions of this invention is critical and lies in the range of about 0.04 to about 0.2 mol of phosphoric acid per mol of hydroxyethyl triazone. Fabrics treated with compositions made, however, with amounts of phosphoric acid below this range have (1) considerably lower crease resistance, (2) considerably lower resistance to scorching both before and after bleaching, (3) considerably more odor and (4) sustain considerably higher damage from retained chlorine. On the other hand fabrics with similar compositions made, however, with amounts of phosphoric acid above this range exhibit no better properties than fabrics treated with compositions of this invention but give rise to solubility problems which include placing and maintaining the active solids in solution.

What is claimed is:

1. Process for making a readily curable, textile crease-proofing composition comprising adding phosphoric acid to 1,3-dimethylol-3,4,5,6-tetrahydro-5(2-hydroxyethyl)-s-triazin-2-one, said phosphoric acid being added in an amount in the range of about 0.04 to about 0.2 mol of phosphoric acid per mol of said 1,3-dimethylol-3,4,5,6-tetrahydra-5(2-hydroxyethyl)-s-triazin-2-one, thus forming said composition.

2. The composition prepared by the process claimed in claim 1.

3. The process as claimed in claim 1 wherein the pH of said resulting composition thereafter is adjusted by adding sodium hydroxide.

References Cited by the Examiner

UNITED STATES PATENTS

| | | | |
|---|---|---|---|
| 2,049,217 | 7/1936 | Meunier | 117—139.4 |
| 2,304,624 | 12/1942 | Burke | 260—248 |
| 2,321,989 | 7/1943 | Burke | 260—248 |
| 2,641,584 | 6/1953 | Martone | 260—248 X |
| 2,950,553 | 8/1960 | Hurwitz | 260—248 X |
| 2,953,563 | 9/1960 | Schaefer et al. | 260—248 |
| 2,977,360 | 3/1961 | Dixon | 260—248 |
| 3,028,264 | 4/1963 | Frick | 117—139.4 |
| 3,051,674 | 8/1962 | Kress | 260—29.4 |
| 3,152,111 | 10/1964 | Taber | 260—248 |

WALTER A. MODANCE, *Primary Examiner.*

WILLIAM D. MARTIN, *Examiner.*

THEODORE G. DAVIS, JOHN M. FORD,
*Assistant Examiners.*